March 18, 1958   H. J. CORTNER   2,827,083
DISPENSING DEVICE FOR GRANULAR AND POWDERED MATERIAL
Filed Dec. 7, 1954   2 Sheets-Sheet 1
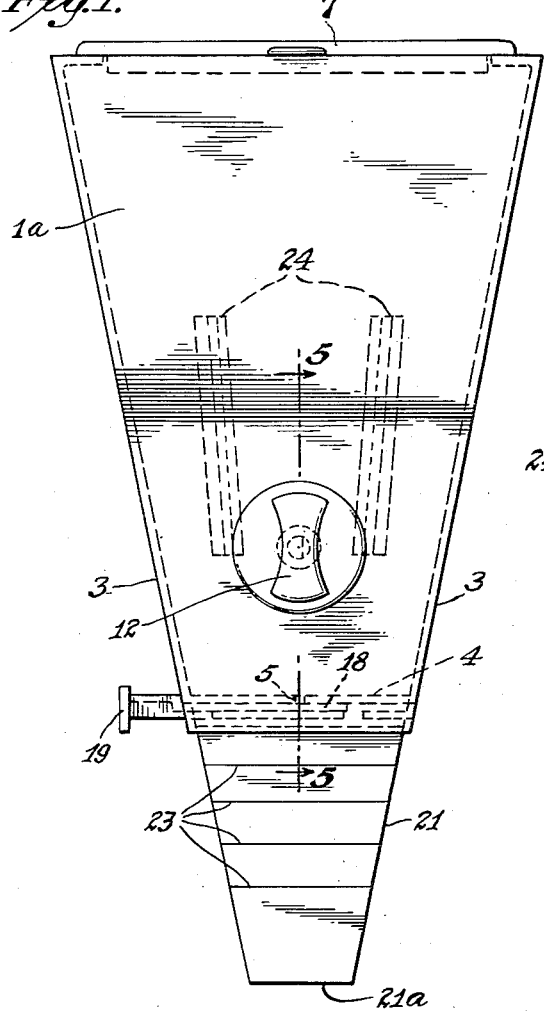
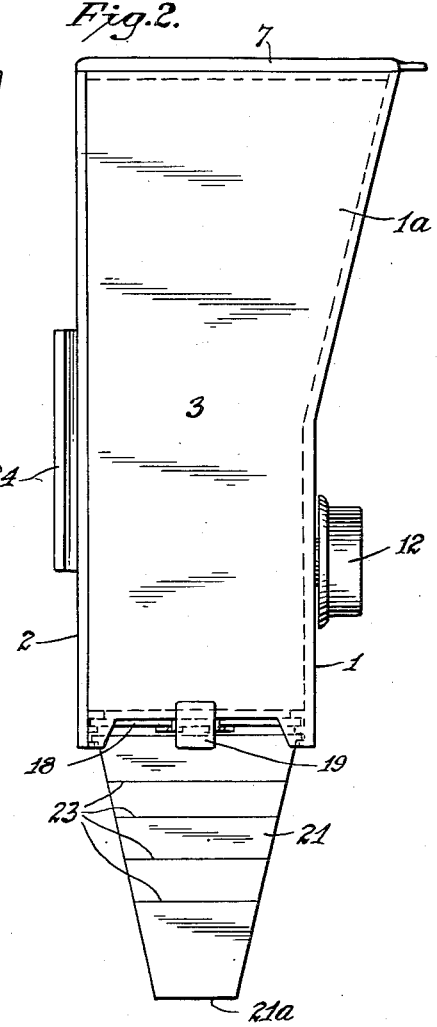
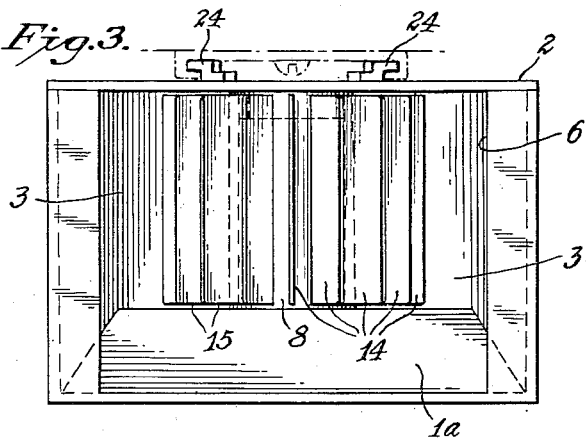
INVENTOR.
HANS JOSEPH CORTNER
BY
Kenyon & Kenyon
ATTORNEYS.

March 18, 1958 H. J. CORTNER 2,827,083
DISPENSING DEVICE FOR GRANULAR AND POWDERED MATERIAL
Filed Dec. 7, 1954 2 Sheets-Sheet 2
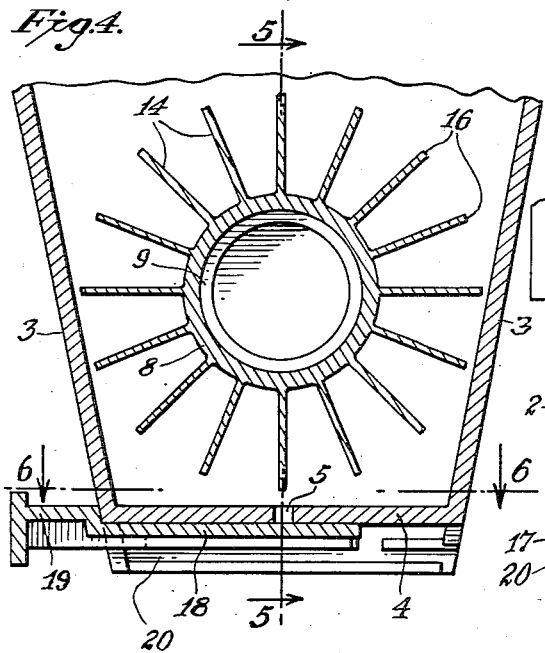
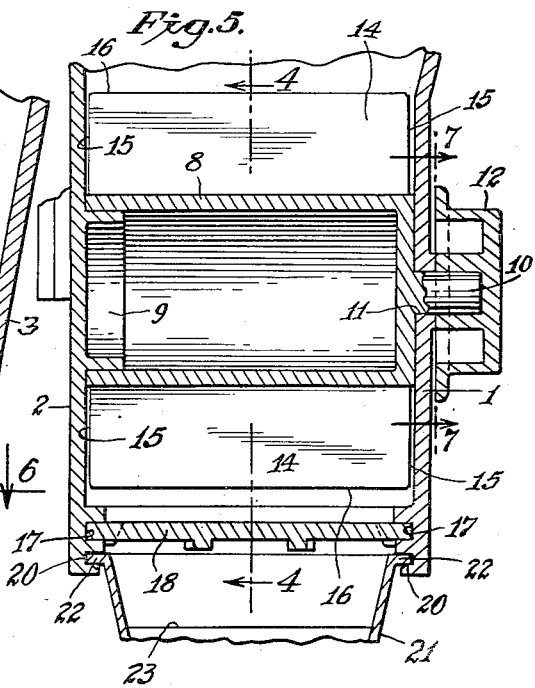
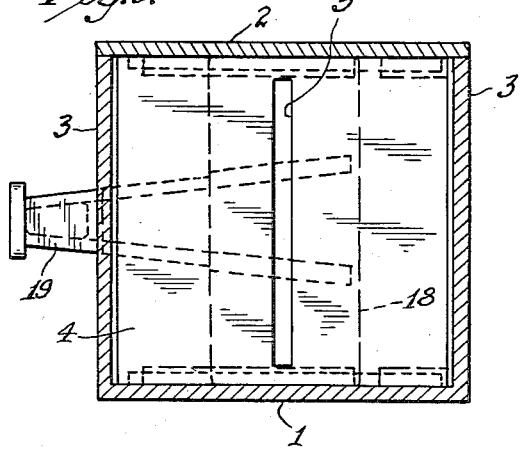
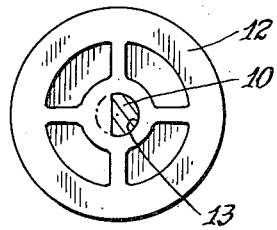
INVENTOR.
HANS JOSEPH CORTNER
BY
ATTORNEYS.

2,827,083

Patented Mar. 18, 1958

2,827,083

DISPENSING DEVICE FOR GRANULAR AND POWDERED MATERIAL

Hans Joseph Cortner, New York, N. Y.

Application December 7, 1954, Serial No. 473,633

1 Claim. (Cl. 141—372)

This invention relates to a dispensing device for granular and powdered material.

This new device is particularly adapted to be made in a form suitable for use in domestic kitchens and adapted to dispense measured amounts of a material such as coffee, sugar, flour and the like.

One of the objects of the invention is to provide a device of this character in a form permitting a reasonably low manufacturing and selling cost while producing a device which is attractive in appearance, efficient in operation and having a long service life. Another object is to provide this kind of device in a form which protects the material to be dispensed from the effects of the atmosphere until such time as the material is dispensed for use, this being of particular importance in connection with coffee which becomes stale when exposed to the atmosphere. Other objects may be inferred from the following disclosure of one specific example of the new device.

This example is illustrated by the accompanying drawings in which:

Fig. 1 is a front view;

Fig. 2 is a side view;

Fig. 3 is a top view showing the cover of the device removed to expose the interior;

Fig. 4 is a vertical cross section of the device taken on the line 4—4 in Fig. 5;

Fig. 5 is a vertical cross section taken on the line 5—5 in Fig. 4;

Fig. 6 is a horizontal cross section taken on the line 6—6 in Fig. 4; and

Fig. 7 is a cross section taken on the line 7—7 in Fig. 5.

This illustrated dispensing device is particularly intended to store and dispense ground coffee but it may be used to handle any granular or powdered material. It is to be understood that it may be desirable to redesign certain of the parts with respect to dimensions and arrangement when handling commodities other than ground coffee.

The device includes a container for the material which is of rectangular cross sectional contour throughout. The lower portion of this container has opposed vertical front and back walls 1 and 2 respectively and opposed declining side walls 3. There is also a flat horizontal bottom wall 4 through which a relatively narrow slot 5 is formed centrally between the declining walls 3 and extending transversely with respect to the vertical front and back walls 1 and 2.

The walls 2 and 3 continue upwardly while the front wall 1 joins with a forwardly slanting wall portion 1a. The various walls thus define a container for the coffee, the entire device being designed preferably so as to hold a little over a pound of coffee. The top of the device has a filling opening 6 which is normally closed by a removable cover 7. This cover is shown as fitting somewhat loosely in Fig. 1 for the purpose of indicating clearly its removable or opening nature, but in the actual device such a cover should be made to fit tightly enough to protect the coffee from the atmosphere. Preferably the cover is made substantially air-tight.

A paddle wheel is journaled transversely between the vertical walls 1 and 2 on an axis parallel to and vertically registered with the slot 5. This paddle wheel comprises a hollow hub 8, the wall 2 being formed with an inwardly projecting boss 9 which extends partly into one end of the hub 8 so as to journal that end. The other end of the hub 8 has a stub shaft 10 which projects through a hole 11 formed through the wall 1. This shaft 10 has an outer portion on the outside of the wall 1, this portion having the form of a segmental cylinder and a finger knob 12 being fitted thereover, this knob 12 having a recess 13 shaped to fit the mentioned portion of the shaft 10. Rotation of the knob 12 causes the hub 8 to rotate inside of the device.

A plurality of radial vanes 14 project from the hub 8. These vanes have radial edges 15 located adjacent to the vertical wall portions 1 and 2 and outwardly projected axial edges 16 which swing adjacent to the declining walls 3 and also the bottom wall 4. The boss 9 and the hole 11 are axially aligned so as to establish the axis of the paddle wheel with respect to the slot 5.

It will be found that for any particular granular or powdered material, it may be necessary to alter the spacing between the vanes 14, or to change the size of the slot 5 or the diameter of the hub 8. The device as illustrated is designed to handle coffee.

Even though the slot 5 is left fully opened granular and powdered material will not flow through this slot 5 unless the material is caused to move past or over the slot 5. This is done by rotation of the knob 12 so as to rotate the vanes 14 which force the coffee, in the case of the illustrated device, to move over the slot 5. As long as this movement prevails some of the coffee will continuously fall through the slot 5, this dispensing action ceasing as soon as rotation of the knob 12 is halted. In the case of coffee the large diameter of the hub 8 has been found necessary to prevent the coffee from packing between the vanes, and the spacing of the vanes should be relatively close together so that they turn easily in coffee.

In any event, the paddle wheel should operate to cause the granular material to flow over the discharge or dispensing opening 5 whenever the dispensing action is desired. At the same time the slot 5, or other opening, should be small enough so that when rotation of the paddle wheel is halted the then stationary material will not gravitationally discharge by itself through the slot 5 or other opening.

The front and back walls 1 and 2 both extend below the outside of the bottom wall 4 and they have a set of interfacing grooves 17 formed therein. A valve plate 18 is slidably arranged in these grooves 17 so as to close the slot 5 when registered therewith. As illustrated, the plate 18 has an outwardly projecting handle 19 so that it may be moved to open or closed positions conveniently. This plate should be made to fit relatively tightly or in a substantially air-tight manner so as to protect the material in the container from having access to the atmosphere through the slot 5. When in operation the handle 19 is pulled outwardly to remove the plate 18 from registration with the slot 5.

The downwardly projecting portions of the walls 1 and 2 have a second set of interfacing grooves 20 formed therein adjacently below the set 17. A dispensed material receiver 21 is provided, this receiver having a mouth dimensioned so that it is substantially co-extensive with the bottom wall 4. The receiver's mouth portion has a set of oppositely extending flanges 22 which are removably located slidably in the second set of grooves 20. This receiver has a rectangular contour provided by four side walls all of which decline, the walls which extend from the walls 3, preferably having the same angularity as the latter. The receiver has a bottom wall 21a which is relatively small as compared to the mouth of the receiver and the receiver has graduations 23 formed in its side walls so that the receiver may function to measure the material dispensed upon rotation of the paddle wheel.

The mouth of the receiver 21 is very wide as compared to the width of the slot 5. Therefore, as the coffee rises in the receiver 21 the latter may be shaken laterally by being slid back and forth in the grooves 20 so as to level off the material being dispensed. The receiver 21 is preferably made of transparent material throughout so that the level of the dispensed material may be observed directly. The slanting sides of the receiver further function to prevent the material dispensed from tending to heap within the receiver and to aid in leveling of the material upon the described shaking practice.

The entire device may be made from plastic if desired, its manufacture presenting no particular problems. The appearance of the device is naturally attractive and because of the vertical back wall 2 the device may be mounted on the kitchen wall, for example. It will be noted that the wall 2 is provided with a mounting wedge 24 of the type which fits in the flat tapered socket customarily used for mounting appliances in the kitchen on the wall, door or the like. When thus mounted the entire device fits rather flatly against the wall and does not protrude to an objectionable extent.

In operation the device is filled with the material, such as coffee, the material being stored where it is convenient and yet being protected from the action of the atmosphere. The receiver 21 is in place as shown by Figs. 1 and 2.

When a dispensed amount of material is desired the handle 19 is pulled outwardly so that the plate 18 clears the slot 5. The coffee or other material does not begin to discharge at this time because the slot 5 is proportioned to prevent free gravitational flow. However, as soon as or as long as the knob 12 is rotated the coffee or other material flows in a substantially uniform stream from the slot 5 and into the receiver 21.

Control of this flow is very effective. The flow stops as soon as the rotation of the paddle wheel, by turning the knob 12, is halted. Therefore, it is easy to bring the level of the material to the desired one of the graduations 23 on the walls of the transparent receiver 21. Although the four slanting or declining walls of the receiver 21 reduce the tendency for a material such as coffee to heap, which interferes with accurately measuring, there is usually a tendency for such heaping to occur. Leveling is effected simply by sliding the receiver rapidly back and forth by sliding the receiver's flanges 22 in the grooves 20. Since the mouth of the receiver is quite wide as compared to the width of the slot 5, it is possible to effect this shaking action while the knob 12 is turned to continue the dispensing action. In other words, the receiver may be shaken rather vigorously while the necessary registration between its mouth and the slot 5 is maintained continuously. After the desired amount is dispensed the handle 19 is pushed inwardly so that the plate 18 closes the slot 5 and protects the material within the device.

I claim:

A dispensing device for coffee and similar granular and powdered material, said device including a container for the material, said container having a lower portion of rectangular contour with opposed vertical walls and opposed declining walls and a bottom wall through which a relatively narrow slit is formed centrally between said declining walls and extending transversely straight with respect to said vertical walls, a paddle wheel journaled transversely between said vertical walls on an axis parallel to and vertically registered with said slit and having radial vanes with radial edges located adjacent to said vertical walls and outwardly projected axial edges which sweep adjacent to said declining walls and said bottom wall upon rotation of said wheel, one of said vertical walls having a hole therethrough registered with the axis of said wheel and the latter having a drive shaft with a portion extending through said hole to the outside of said one of said vertical walls and said shaft having means on the outer end of said portion thereof for rotating the same, the upper portion of said container having a filling opening and a tight closure therefor, the said vertical walls having portions extending below the outside of said bottom wall and having a set of interfacing grooves formed therein and a valve plate slidably arranged in said grooves for closing said slit when registered therewith, said valve plate having a controller handle projecting therefrom transversely to and extending horizontally beyond the outside of the adjacent one of said declining walls, said extending portions of said vertical walls having a second set of interfacing grooves formed therein adjacently below the first named set, and a dispensed material receiver having a mouth substantially co-extensive with said bottom wall and a set of oppositely extending flanges removably located slidably in said second set of grooves, said receiver having a rectangular contour and four side walls all of which decline and a bottom wall which is relatively small as compared to said mouth of said receiver, at least one of said receiver's side walls being graduated so that said receiver may function to measure the material dispensed upon rotation of said wheel.

References Cited in the file of this patent

UNITED STATES PATENTS

| | | |
|---|---|---|
| 1,940,447 | Coffing | Dec. 19, 1933 |
| 2,364,326 | Stephens | Dec. 5, 1944 |
| 2,416,811 | Bailey | Mar. 4, 1947 |
| 2,556,782 | Venters | June 12, 1951 |
| 2,605,934 | Telander | Aug. 5, 1952 |
| 2,609,127 | Wood | Sept. 2, 1952 |
| 2,610,767 | Gardner et al. | Sept. 16, 1952 |